Figure 3:
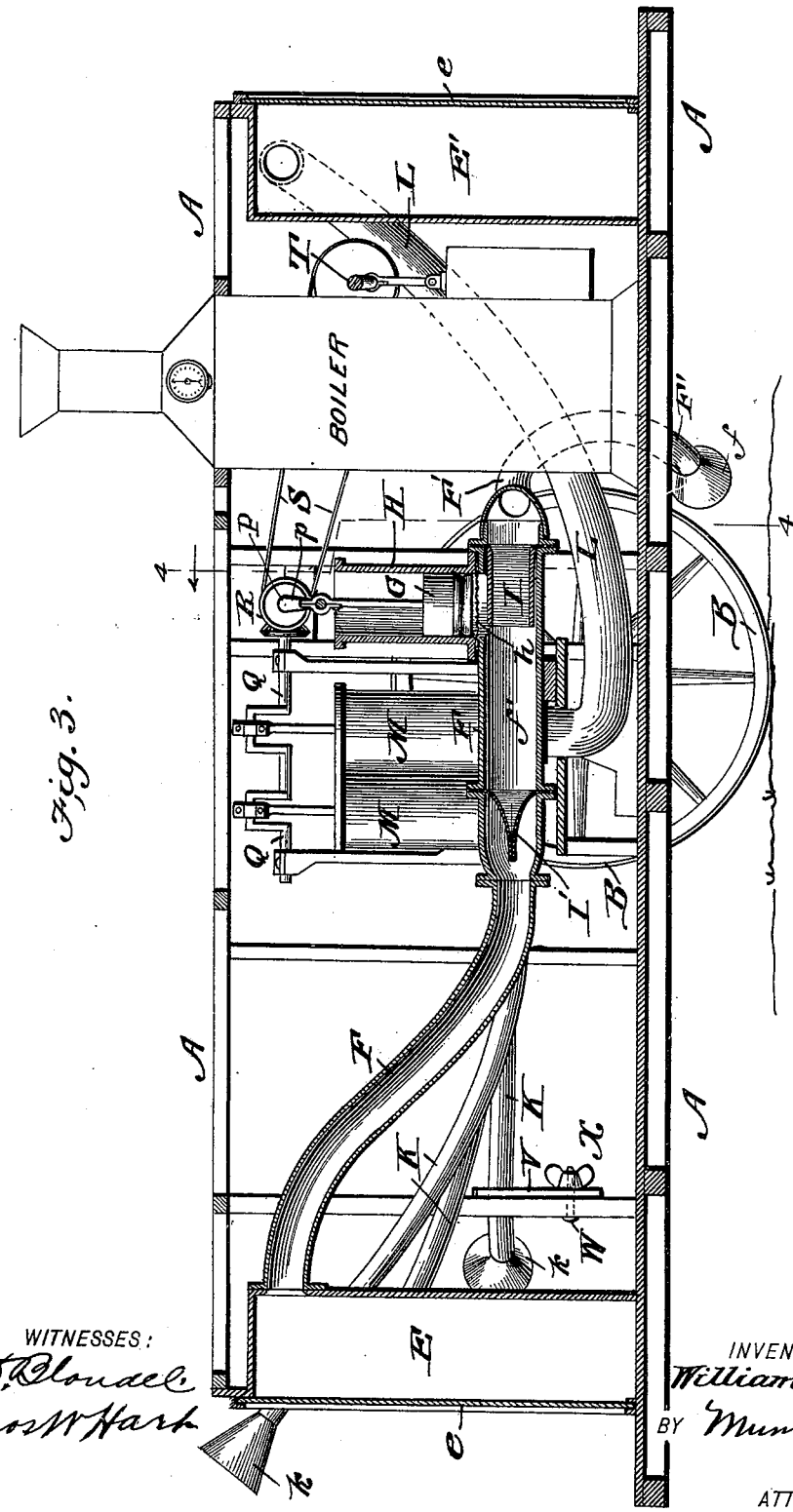

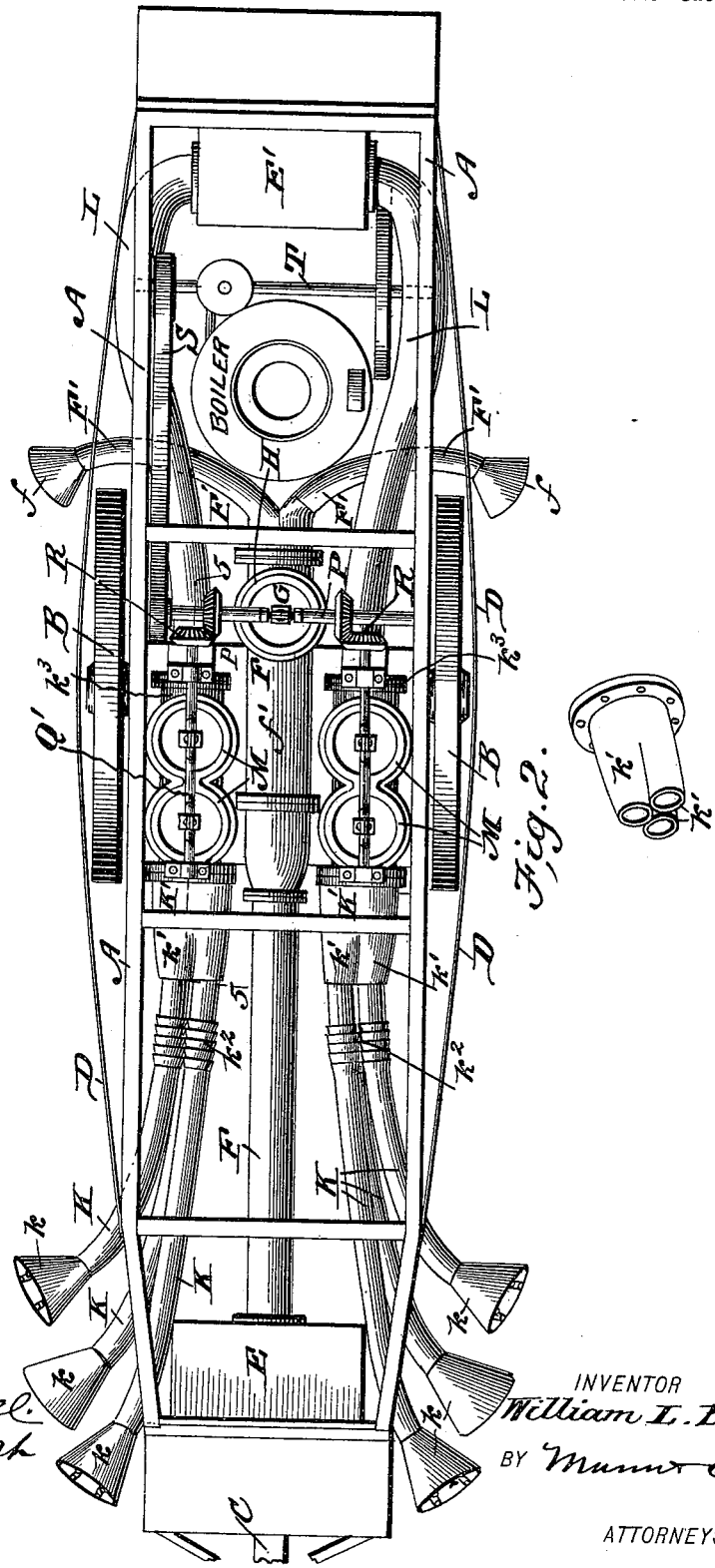

No. 644,544. Patented Feb. 27, 1900.
W. L. BELT.
COTTON PICKING MACHINE.
(Application filed Sept. 26, 1899.)
(No Model.) 3 Sheets—Sheet 2.

WITNESSES:
INVENTOR
William L. Belt.
BY Munn & Co.
ATTORNEYS

No. 644,544. Patented Feb. 27, 1900.
W. L. BELT.
COTTON PICKING MACHINE.
(Application filed Sept. 26, 1899.)
(No Model.) 3 Sheets—Sheet 3.
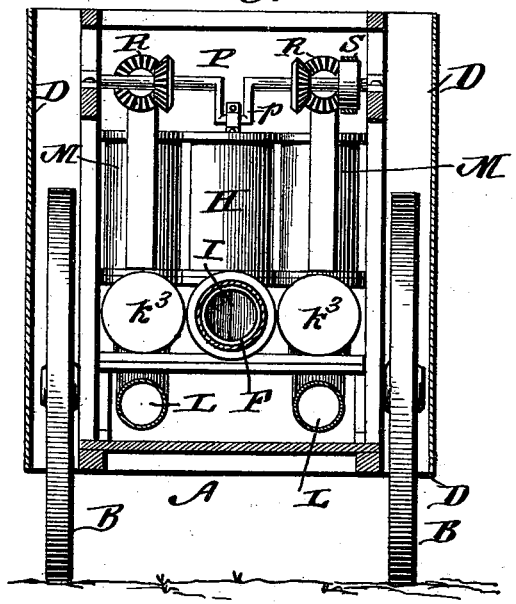
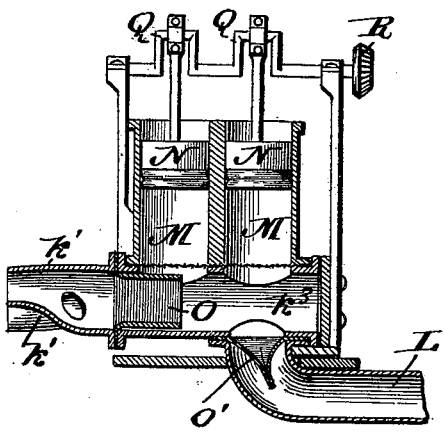
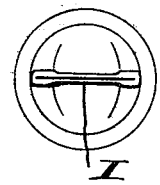
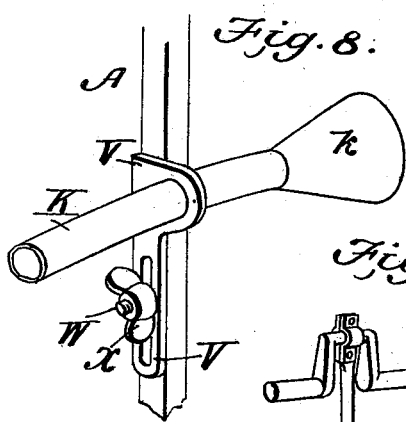
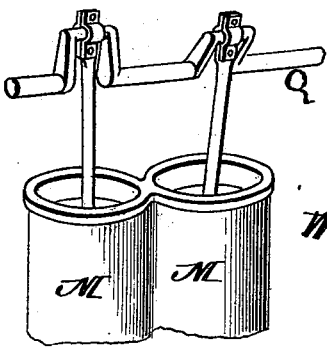
WITNESSES:
M. S. Blondel.
Amos W. Hark
INVENTOR
William L. Belt.
BY Munn & Co.
ATTORNEYS
THE NORRIS PETERS CO., PHOTO-LITHO., WASHINGTON, D. C.

UNITED STATES PATENT OFFICE.

WILLIAM L. BELT, OF WASHINGTON, DISTRICT OF COLUMBIA, ASSIGNOR OF ONE-FOURTH TO WILLIAM WALLACE KIRBY, OF SAME PLACE.

COTTON-PICKING MACHINE.

SPECIFICATION forming part of Letters Patent No. 644,544, dated February 27, 1900.

Application filed September 26, 1899. Serial No. 731,711. (No model.)

*To all whom it may concern:*

Be it known that I, WILLIAM L. BELT, of Washington city, in the District of Columbia, have invented a new and Improved Cotton-Picking Machine, of which the following is a specification.

My invention is an improvement in that class of cotton-pickers in which the cotton is extracted from the bolls by air-suction applied through the media of flexible tubes and a fan or other equivalent device. For various reasons machines of this class have proved impracticable in the field, and hence failed to go into general use.

My improvement is the result of long practical experience in cotton culture and of many experiments with pneumatic picking or extracting apparatus.

The construction and operation of the same are as hereinafter set forth, and shown in the accompanying drawings, in which—

Figure 1 is a plan view. Fig. 2 is a perspective view of a three-pipe or tube coupling. Fig. 3 is a central vertical longitudinal section. Fig. 4 is a vertical cross-section on line 4 4 of Fig. 3. Fig. 5 is a vertical longitudinal section on line 5 5 of Fig. 1. Figs. 6 and 7 are side and end views of one of the elastic air and cotton valves. Fig. 8 is a perspective view showing an adjustable support for the suction and cotton-conducting tubes. Fig. 9 is a perspective view of one of the cups attached to said tubes. Fig. 10 is a perspective view showing an alternative arrangement of cranks for operating the pistons of the suction and blast cylinders.

The frame A of the machine is narrow, being oblong and rectangular, and it is mounted centrally upon an axle supported by two running-wheels B, arranged on opposite sides of the frame. A pole or shafts C are secured to the front end, so that the machine may be drawn between the rows of cotton-plants by means of a draft animal or animals.

On each side of the frame A a smooth convex plate D is arranged exterior to and covers nearly the whole of the adjacent wheel B to serve as a fender or guard, preventing contact of the wheel or frame with the unripe bolls, which are very tender and would be easily injured thereby, so that the contained cotton would fail to mature. These fenders D are preferably constructed of sheet metal and are attached to the frame A near the front and rear ends of the same.

Cotton ripens and the bolls open first on the lower branches of the plants and the ripening process extends gradually upward. The cotton nearest the ground is necessarily most exposed to access of dust, grit, and other foreign substances, and it is therefore desirable to gather such cotton and deposit it in a receptacle separate from the other and cleaner portion. To this end, I have devised and arranged special air suction and blast apparatus to operate on the lower bolls and other separate apparatus to act on the middle and topmost bolls and have provided separate receptacles E and E', arranged at the ends of the frame A. Thus the front box or receptacle E receives the cotton from the lower bolls, while the rear one, E', receives the cleaner cotton. Sliding or other suitable doors $e$ (see Fig. 3) are provided for removal of the cotton from boxes E E'. With the latter I connect the separate air suction and blast apparatus before referred to and which will now be described.

As shown prominently in Figs. 1 and 3, a large sheet-metal tube F extends back from the top portion of the front box or receptacle E and terminates in lateral branches F', having funnel-shaped cotton-gathering cups $f$. These branches F' extend downward and are so curved that their cups $f$ lie close to the ground and project forward as well as a little beyond the fenders. They are thus adapted to come in contact with the bolls in the lower range and extract therefrom the ripe cotton, which is drawn into the branch tubes F', thence into the horizontal section $f'$ of the main tube F, and then forced through the latter into receptacle E. The means for effecting this operation are an air suction and blast apparatus, Figs. 1, 3, and 4, comprising a piston G, cylinder H, and valves I and I', arranged in the cylinder or section $f'$. The piston is reciprocated by means hereinafter described.

The piston-cylinder H is arranged vertically and opens into main tube section $f'$, a wire screen $h$ (see Fig. 3) being arranged at the junction to prevent cotton entering the piston-cylinder. The piston is provided with leather packing, whose free edges project both upward and downward, so that the piston may act to produce alternately a vacuum and a blast—that is to say, a vacuum or suction when ascending and a blast when descending.

The valves I and I' are constructed of sections of a slightly-vulcanized rubber tube, the same being thickened along the sides at opposite points, as shown in Figs. 6 and 7. The valves are held distended at their front ends and remain normally collapsed at their rear ends. Thus cotton may enter and pass through them from front to rear, but not reversely. The valves are separated a short distance, and the front or entrance valve I is almost directly under the piston-cylinder H. The latter might, however, be located at any point between the two valves. When the piston G ascends, the rear valve I' remains closed and prevents air entering from the rear portion of tube F, but the front valve I opens, and ripe cotton is drawn from the bolls into cups $f$ into branch tubes F', and thence through valve I into the cylinder $f'$, where it is momentarily arrested as the piston H reverses its stroke and descends, when the blast thus produced causes valve I to collapse and forces the cotton through the rear valve I'. Thus there is a succession of vacuums and plenums or suctions and blasts, which alternately draw in and expel the cotton by reason of the automatic action of the entrance-valve I and check-valve I'.

Substantially the same combination of parts is employed to form the suction and blast apparatus for extracting cotton from the middle and upper series of bolls. In this case two separate sets of such apparatus are arranged on opposite sides of the machine, as shown in Fig. 1—that is to say, a series of sheet-metal tubes K, having cups $k$, project on each side of the frame A at its front end and are connected by a coupling $k'$, Fig. 2, with a main tube L, that leads to box or receptacle E'. A strong suction and blast being required for these several tubes K, I employ two cylinders M and pistons N. (See Fig. 5.)

It is requisite the machine shall be narrow to enable it to pass between rows of growing cotton. I therefore arrange the three cotton-conducting tubes parallel and close together lengthwise of the frame A. The power of suction or exhaust required for the two side tubes having the larger number of nozzles $k$ also requires to be greater than that of the middle tube having the single nozzles $f$. I therefore provide two vertical cylinders M M for each of the side tubes K L, while a single one, H, suffices for the middle tube. The cylinders M M of each pair are arranged in line and parallel with the frame in order to economize space transversely of the machine in a manner which would be impracticable with a single cylinder of double the capacity of the cylinders M M. I further provide for simultaneous operation of the pistons N of each pair of said cylinders by means of a crank-shaft Q, which is arranged over a side tube and parallel thereto. The two opposite shafts Q are connected by bevel-gearing R with the ends of a transverse crank-shaft P, which is arranged directly over the central vertical cylinder H and provided with a crank $p$ for attachment of the rod of piston G of said cylinder. (See Fig. 3.) This crank-shaft P is driven by a belt S from the shaft T of a steam-engine. Thus said shaft P drives the two parallel shafts Q Q, and hence the pistons of the five cylinders M M H are operated together, the piston G rising as the others descend, and vice versa.

The portions $k^3$ (see Fig. 5) of the side tubes K L have collapsible inlet and discharge valves O and O', substantially like the valves I I' of cylinder H, before described.

In Fig. 10 I show an alternative arrangement of the cranks of side shafts. Thus in place of the cranks being in the same plane they are set quartering, so that the rear piston rises and descends a little in advance of the other for the purpose of producing a better effect as to suction and blast.

Cotton-plants vary in height in different localities and even in the same field. To provide for such vertical adjustment of the cups $k$ and tubes K as may be required to meet different average conditions, I employ a means of support therefor which admits of convenient adjustment. In Figs. 3 and 8 I show a plate V, having a hole through which a tube K passes, and a closed slot for reception of a screw-bolt W, having a winged clamping-nut X. The plate V may obviously be slid up or down and clamped in any selected position. Similar or other suitable means of support may be provided for the lowermost tubes F'. The adjustable branches K are flexibly connected at $k^2$, Fig. 1, with the main tubes to permit them to be readily adjusted as required.

To prevent entrance of portions of the bolls and other trash into the cups, they are provided with internal guards $f^3$, Fig. 9, in the form of lengthwise ribs arranged at the mouth. These do not materially obstruct the entrance of cotton, whose elasticity and compressibility enable it to easily pass over and between the ribs $f^3$, while the leaves of the bolls and adhering stems are obstructed and wholly or mainly excluded.

What I claim is—

1. In a pneumatic cotton-picking machine, the combination, with the wheeled frame, of three cotton-conducting tubes arranged alongside each other longitudinally of the frame, each of the two outer tubes having a separate series of branches and nozzles $k$, and two cylinders arranged vertically in connection with each such tube, a double crank-shaft arranged over each pair of such cylinders, and connected with pistons thereof, a single vertical cylinder H connected with the middle tube, collapsible rubber inlet and outlet valves, arranged with the cylinders as specified, a transverse crank-shaft which is operatively connected with the piston of said cylinder, gearing connecting said transverse shaft with the side shafts, and two separate cotton-receptacles with which the aforesaid tubes connect, respectively, as shown and described.

2. In a pneumatic cotton-picking machine, the combination with an air and cotton conducting tube, of one or more terminal tubes, a flared or funnel-shaped cup secured to the end of each terminal, and having internal ribs arranged at the mouth, as shown and described, for the purpose specified.

In testimony whereof I have signed my name to this specification in the presence of two subscribing witnesses.

WILLIAM L. BELT.

Witnesses:
   AMOS W. HART,
   SOLON C. KEMON.